United States Patent
Zhao et al.

(10) Patent No.: US 10,011,779 B2
(45) Date of Patent: Jul. 3, 2018

(54) ADSORBENT FOR DESULFURIZATION OF GASOLINE AND METHOD FOR DESULFURIZATION OF GASOLINE

(71) Applicant: CHINA UNIVERSITY OF PETROELUM-BEIJING, Beijing (CN)

(72) Inventors: Liang Zhao, Beijing (CN); Jinsen Gao, Beijing (CN); Chunming Xu, Beijing (CN); Tianzhen Hao, Beijing (CN); Xiaona Han, Beijing (CN)

(73) Assignee: CHINA UNIVERSITY OF PETROLEUM-BEIJING, Beijing (CN)

(*) Notice: Subject to any disclaimer, the term of this patent is extended or adjusted under 35 U.S.C. 154(b) by 112 days.

(21) Appl. No.: 14/931,690

(22) Filed: Nov. 3, 2015

(65) Prior Publication Data
US 2016/0222302 A1 Aug. 4, 2016

Related U.S. Application Data

(63) Continuation of application No. PCT/CN2015/075886, filed on Apr. 3, 2015.

(30) Foreign Application Priority Data

Feb. 4, 2015 (CN) .......................... 2015 1 0058264
Feb. 4, 2015 (CN) .......................... 2015 1 0059630

(51) Int. Cl.
*C10G 25/00* (2006.01)
*C10G 25/12* (2006.01)
(Continued)

(52) U.S. Cl.
CPC ............ *C10G 25/003* (2013.01); *B01J 20/18* (2013.01); *B01J 20/20* (2013.01); *B01J 20/3204* (2013.01);
(Continued)

(58) Field of Classification Search
CPC ...... C10G 25/003; C10G 25/12; C10G 45/08; C10G 53/08; C10G 53/12; C10G 67/00;
(Continued)

(56) References Cited

U.S. PATENT DOCUMENTS

| | | | |
|---|---|---|---|
| 7,258,795 B1* | 8/2007 | Nemeth ................. | B01D 15/00 210/670 |
| 2004/0007506 A1* | 1/2004 | Song .................... | C10G 25/003 208/244 |

(Continued)

FOREIGN PATENT DOCUMENTS

| | | |
|---|---|---|
| CN | 102764630 A | 11/2012 |
| CN | 104277874 A | 1/2015 |
| CN | 104277875 A | 1/2015 |

OTHER PUBLICATIONS

Li et al. ("Preparation and adsorption desulfurization performance evaluation of new composite zeolite [J]." Petrochemical Technology & Application 5 (2009): 002, abstract).*

(Continued)

*Primary Examiner* — Patricia L. Hailey
*Assistant Examiner* — Michael Forrest
(74) *Attorney, Agent, or Firm* — J.C. Patents

(57) ABSTRACT

The present invention provides an adsorbent and a method for desulfurization of gasoline. The adsorbent is obtained by loading active metal component on a composite carrier comprising zeolite and active carbon subjected to alkali treatment respectively, the active metal is selected from one or more elements of IA, IIA, VIII, IB, IIB and VIB groups in the periodic table. This method uses the adsorbent to conduct gasoline adsorption desulfurization, which especially cuts the gasoline into a light and a heavy gasoline fraction firstly, then the light fraction is subjected to adsorption desulfurization using the adsorbent, and the heavy fraction is subjected to selective hydrodesulfurization, a (Continued)

cutting temperature of the light and the heavy gasoline fraction is 70-110° C. The adsorbent has a large sulfur adsorption, a long service life, and simply to be regenerated; the method can realize deep desulfurization of gasoline, and has a less octane number loss.

19 Claims, 3 Drawing Sheets

(51) Int. Cl.
| | |
|---|---|
| *C10G 45/08* | (2006.01) |
| *C10G 67/16* | (2006.01) |
| *C10G 67/00* | (2006.01) |
| *C10G 53/12* | (2006.01) |
| *B01J 20/34* | (2006.01) |
| *B01J 20/32* | (2006.01) |
| *B01J 20/18* | (2006.01) |
| *B01J 20/20* | (2006.01) |
| *C10G 53/08* | (2006.01) |

(52) U.S. Cl.
CPC ....... *B01J 20/3236* (2013.01); *B01J 20/3416* (2013.01); *C10G 25/12* (2013.01); *C10G 45/08* (2013.01); *C10G 53/08* (2013.01); *C10G 53/12* (2013.01); *C10G 67/00* (2013.01); *C10G 67/16* (2013.01); *C10G 2300/202* (2013.01); *C10G 2400/02* (2013.01)

(58) Field of Classification Search
CPC . C10G 67/16; B01J 20/18; B01J 20/20; B01J 20/3204; B01J 20/3236; B01J 20/3416
See application file for complete search history.

(56) References Cited

U.S. PATENT DOCUMENTS

| | | | |
|---|---|---|---|
| 2005/0061712 A1 | 3/2005 | Nicolaos et al. | 208/208 |
| 2005/0173297 A1* | 8/2005 | Toida | B01J 20/165 208/14 |
| 2005/0258077 A1 | 11/2005 | Landau et al. | 208/244 |
| 2008/0289496 A1 | 11/2008 | Poshusta et al. | 95/113 |

OTHER PUBLICATIONS

Tian et al ("Adsorptive desulfurization over hierarchical beta zeolite by alkaline treatment." Journal of Natural Gas Chemistry 21.6 (2012): 647-652).*
Chinese First Examination Report of corresponding China patent application No. 201510059630.0, dated Oct. 19, 2015.
Ming, Ke et al., "Application of Activated Charcoal Desulphurizer in FCC Gasoline Petreating" Petroleum Refinery Engineering, Jul. 2002, vol. 32, No. 7, pp. 43-46.
The Chinese International Search Report of corresponding international PCT application No. PCT/CN2015/075886, dated Nov. 17, 2015.
The Chinese First Examination Report of corresponding China patent application No. 201510058264.7, dated Dec. 3, 2015.

* cited by examiner

ADSORBENT FOR DESULFURIZATION OF GASOLINE AND METHOD FOR DESULFURIZATION OF GASOLINE

CROSS-REFERENCE TO RELATED APPLICATIONS

This application is a continuation of International Application No. PCT/CN2015/075886 filed on Apr. 3, 2015, which claims the priority benefits of Chinese Patent Application No. 201510059630.0 and 201510058264.7, which were filed on Feb. 4, 2015. The contents of the above identified applications are incorporated herein by reference in their entireties.

FIELD OF THE TECHNOLOGY

The present invention relates to a desulfurization adsorbent and a desulfurization method and, in particular, to an adsorbent for desulfurization of gasoline and a method for desulfurization of gasoline.

BACKGROUND

About 70% of the commercial gasoline in China comes out from a heavy oil fluid catalytic cracking (FCC) processes, since feedstock of heavy oil contains a great number of sulfur, nitrogen and oxygen heteroatom compounds as well as colloidal asphaltenes, fluid catalytic cracking gasoline not only has a high content of sulfur, but also has a high content of olefin components, in the commercial gasoline, more than 90% of sulfur comes from the fluid catalytic cracking gasoline, which makes sulfur content of China's gasoline much higher than that of foreign gasoline. Thus, how to reduce sulfur content in the fluid catalytic cracking gasoline is a key for reducing sulfur content in the commercial gasoline. Especially, State V gasoline quality criteria which will be implemented nationwide on Jan. 1, 2018 requires that sulfur content in gasoline should be no more than 10 ppm and olefin content should be no more than 24%, exploration and promotion of techniques for deep desulfurization of gasoline has become a pressing demand for the petroleum refining industry.

Desulfurization techniques used by the petroleum refining industry are divided into hydrodesulfurization technique and non-hydrodesulfurization technique, currently hydrodesulfurization is the main approach for desulfurization. For instance, Sinopec Research Institute of Petroleum Processing developed an FCC gasoline selective hydrodesulfurization process (RSDS-I) in 2001, where FCC gasoline is firstly cut into a light fraction and a heavy fraction at a cutting temperature of 90° C., and then the light fraction is subjected to alkali extraction mercaptan removal, and the heavy fraction is subjected to selective hydrodesulfurization using a main catalyst of RSDS-I and a protective agent of RGO-2; and in a second generation of FCC gasoline selective hydrodesulfurization technique (RSDS-II) for improvements on the process above, a cutting point of the light fraction and heavy fraction is decreased to 70° C., and a second generation of hydrogenation catalysts RSDS-21 and RSDS-22 are used in a selective hydrodesulfurization portion of the heavy fraction.

Axens Corporate of French Institute of Petroleum (IFP) developed a Prime-G+ process, where a process flow of full range pre-hydrogenation, the light and heavy gasoline cutting and heavy fraction selective hydrodesulfurization is used, and the cutting temperature is set between 93-149° C. according to a target value of sulfur content, and during the full range pre-hydrogenation process, light sulfide reacts with diolefin in the presence of a catalyst of HR845 to form sulfide with a high boiling point, thus olefin is not saturated; furthermore, two catalysts of HR806 and HR841 are used in the selective hydrodesulfurization of the heavy fraction, thus the operation is more flexible.

Sinopec Fushun Research Institute of Petroleum and Petrochemicals developed an OCT-M process, where FCC gasoline is cut into a light fraction and a heavy fraction at a cutting temperature of 90° C., in which the light fraction is subjected to mercaptan removal and the heavy fraction is subjected to selective hydrodesulfurization using a combined catalyst of FGH-20/FGH-11.

Hai shun de Special Oil Co., Ltd developed an HDDO series diolefin removal catalyst, an HDOS series deep hydrodesulfurization catalyst, an HDMS series mercaptan removal catalyst and a corresponding FCC gasoline selective hydrodesulfurization process (CDOS), where FCC gasoline is firstly subjected to a diolefin removal reaction at a relatively low temperature in a hydrogen condition, then the FCC gasoline is cut into light and heavy components, the heavy fraction is subjected to deep hydrodesulfurization, and the hydrogenated heavy fraction is reconciled with the light fraction to obtain a clean gasoline with less sulfur.

The above techniques have a common problem that the light fraction formed by the cutting has a low yield, and there are fewer components having a content less than 10 ppm, and it is difficult to reduce sulfur content of the light fraction below 10 ppm by means of mercaptan removal only; when gasoline products having sulfur content less than 10 ppm are produced, a majority of light fraction still need to be hydrodesulfurized, thus loss of octane number of full range gasoline is higher (for instance, up to 3.0-4.0). Furthermore, even though the sulfur content can be made less than 10 ppm by means of hydrodesulfurization, there are still the drawbacks that investment and operational costs are high, and a large number of olefin is saturated while sulfide is removed, which not only increases hydrogen consumption, but also reduces octane number of gasoline greatly.

The non-hydrodesulfurization technique is further classified as adsorption desulfurization, oxidation desulfurization, extraction desulfurization, and biological desulfurization techniques, etc., the adsorption desulfurization technique which has been studied widely so far is one of potential methods for deep desulfurization with low energy consumption and almost no loss of octane number since it is carried out at room temperature and atmospheric pressure.

An IRVAD technique jointly developed by Black & Veatch Pritchard Inc. and Alcoa Industrial Chemicals employs multi-stage fluidized bed adsorption, which uses an alumina substrate selective solid adsorbent to process liquid hydrocarbons, during the adsorption, the adsorbent is in countercurrent contact with the liquid hydrocarbons, the used adsorbent countercurrently reacts with a recycled hot gaseous flow (such as hydrogen) to be regenerated. The desulfurization rate of this technique can reach above 90%, however, this adsorbent is of less selectivity, sulfur adsorption capacity thereof is small, and the regeneration process is relatively complicated.

Philips Petroleum Company developed an S-Zorb process where a specific adsorbent is used for desulfurization in a hydrogen condition, the adsorbent takes zinc oxide, silicon dioxide and aluminium oxide as a carrier and loads metal components such as Co, Ni and Cu, etc., which can absorb a sulfur atom in sulfide to maintain it on the adsorbent, whereas the hydrocarbon structure part of the sulfide is released back to the process stream so as to realize a desulfurization process. This process does not generate H$_2$S during the reaction, thereby preventing H$_2$S from reacting with olefin again to generate mercaptan. However, the desulfurization technique places a relatively harsh requirement upon process operation conditions, the temperature of the desulfurization reaction is 343-413° C. and the pressure is 2.5-2.9 MPa.

The adsorption desulfurizer described above cannot be satisfactorily used in the selective hydrodesulfurization of the heavy fraction due to problems such as limited deep desulfurization and small sulfur adsorption capacity, low selectivity, short lifespan, relatively complicated regeneration process and harsh desulfurization conditions. Thus, there is a pressing demand to develop a method for desulfurization of gasoline, of which loss of octane number is less, desulfurization degree is highly deep, and the operation is convenient and flexible.

SUMMARY

The present invention provides an adsorbent for desulfurization of gasoline, which is used to solve said drawbacks in the prior art such as limited deep desulfurization and small sulfur adsorption capacity of the desulfurization adsorbent, low selectivity, short service life, relatively complicated regeneration process, and harsh desulfurization conditions.

The present invention further provides a method for desulfurization of gasoline, which is used to solve said drawbacks in the prior art such as limited desulfurization of the desulfurization method and great loss of octane number.

The present invention provides an adsorbent for desulfurization of gasoline, which is obtained by loading an active metal component on a composite carrier, the composite carrier comprises a zeolite and an active carbon which are subjected to alkali treatment respectively, where, the active metal is selected from one or more elements of IA, VIII, IB, IIB and VIB groups in the periodic table.

In the composite carrier of the present invention, a mass ratio of the zeolite to the active carbon is (20-80):(80-20), preferably (20-60):(80-40).

Furthermore, the zeolite is an X type, a Y type or a ZSM-5 type zeolite. The present invention does not strictly limit the adopted X type and the ZSM-5 type zeolite; a ratio of silicon atoms to aluminum atoms in skeleton of the Y type zeolite is no less than 3.0 (as measured by an XRD method). In addition, the present invention does not strictly limit the active carbon used, and a specific surface area thereof may be about 1000 m$^2$/g generally.

In the present invention, the active metal selected from IA group in the periodic table is, for instance, potassium (K), sodium (Na), etc.; the active metal selected from VIII group in the periodic table is, for instance, iron (Fe), cobalt (Co), nickel (Ni), etc.; the active metal selected from IB group in the periodic table is, for instance, copper (Cu), silver (Ag), etc.; the active metal selected from IIB group in the periodic table is, for instance, zinc (Zn), etc.; the active metal selected from VIB group in the periodic table is, for instance, molybdenum (Mo), etc.

Furthermore, the active metal is selected from at least two of Ni, Fe, Ag, Co, Mo, Zn and K, in which Ni may have a loading of 10-30% on the composite carrier; Fe may have a loading of 5-15% on the composite carrier; Ag may have a loading of 5-10% on the composite carrier; Co may have a loading of 5-10% on the composite carrier; Mo may have a loading of 5-10% on the composite carrier; Zn may have a loading of 5-15% on the composite carrier; K may have a loading of 5-15% on the composite carrier. The loading is a loading of each active metal on the composite carrier respectively.

Furthermore, the active metal has a loading of 2-30% on the composite carrier, preferably 5-25%, more preferably 5-20%. When more than two active metals are loaded on the composite carrier, the loading is an overall loading of the active metals.

In an embodiment, the active metal is K and Ni; furthermore, K has a loading of 5-15% on the composite carrier, Ni has a loading of 10-25% on the composite carrier; furthermore, K and Ni which are loaded on the composite carrier have a mass ratio of (0.2-0.5):1.

In another embodiment, the active metal is Zn and Fe; furthermore, Zn has a loading of 5-15% on the composite carrier, Fe has a loading of 8-15% on the composite carrier; furthermore, Zn and Fe which are loaded on the composite carrier have a mass ratio of (0.5-1):1.

The present invention further provides a method for preparing the desulfurization adsorbent described above, including steps of:

blending the zeolite and the active carbon subjected to alkali treatment, respectively, in proportion to prepare the composite carrier;

impregnating the composite carrier with a soluble salt solution of the active metal, and drying the composite carrier impregnated with soluble salt solution and, then, calcinating to obtain the desulfurization adsorbent.

In an embodiment, the alkali treatment includes treating the zeolite and the active carbon, respectively, as follows: blending at a mass ratio of the zeolite or the active carbon to alkali to water: (0.1-2):(0.05-2):(4-15), and stirring the mixture for 0.1-24 h at the temperature of 0-120° C., and then drying, the above alkali treatment is conducted at least one time.

The present invention does not strictly limit the alkali used in the alkali treatment, for instance, a NaOH solution at 0.10-1.0 mol/L may be used. Furthermore, a temperature of the stirring treatment may be 30-100° C., and the time may be 1-10 h; furthermore, a temperature of the stirring treatment may be 70-80° C., and the time may be 2-4 h. A temperature of the drying after the stirring treatment may be, for instance, 100-120° C., and the time may be, for instance, 5-8 h. The alkali treatment process may be one time or two times.

In the present invention, a soluble salt solution of the active metal may be, for instance, a sulfate solution, a nitrate solution, etc., preferably the sulfate solution. The impregnation may be incipient wetness impregnation which is a conventional impregnation method in the art, a specific operation thereof may be, for instance: at an room temperature and in a stirring condition, instilling a soluble salt solution of the active metal into the composite carrier until the composite carrier is aggregated to a ball, and then standing for a period of time (for instance, 1-3 h). Especially, when two active metal components are loaded on the composite carrier, firstly a soluble salt solution of the first active metal is loaded by incipient wetness impregnation, upon washing, drying and calcinating, then a soluble salt solution of the second active metal is loaded by incipient wetness impregnation, upon washing, drying and calcinating, a composite carrier loading two active metal components may be prepared.

During the impregnation, the amount of soluble salt of the active metals needed for the impregnation may be calculated according to a requirement for the loading of the active metals on the composite carrier respectively and a requirement for the overall loading (loading more than two active metal components) of the active metals on the composite carrier.

Furthermore, the drying for the impregnated material is conducted for 12-24 h at a temperature of between 90-120° C., preferably for 18-24 h at a temperature of between 110-120° C. The impregnated material is subjected to calcinations for 4-6 h at a temperature of between 450-640° C. after being dried.

Furthermore, the impregnated material being subjected to calcinations after being dried includes cooling the dried material down to a room temperature, elevating the temperature to 400° C. at a speed of 6° C./min firstly, and then elevating the temperature to 450-640° C. at a speed of 3° C./min.

The present invention further provides a method for regenerating any one of the desulfurization adsorbents described above, including: sequentially conducting steam washing, nitrogen drying at a temperature of between 200-400° C. and nitrogen cooling to the desulfurization adsorbent to be regenerated.

Furthermore, the regenerating method includes firstly sweeping the desulfurization adsorbent to be regenerated with steam at a temperature of 130-180° C. for 1-3 h for washing, then sweeping for 10-60 min with nitrogen at a temperature of 200-400° C. for drying, and finally sweeping for 10-60 min with nitrogen at a room temperature for cooling.

The present invention further provides a method for desulfurization of gasoline, including: conducting adsorption desulfurization to gasoline using any one of the desulfurization adsorbents described above.

In an embodiment, the gasoline is firstly cut into a light gasoline fraction and a heavy gasoline fraction, and then the light gasoline fraction is subjected to adsorption desulfurization using the desulfurization adsorbent to obtain a desulfurized light gasoline fraction, and the heavy gasoline fraction is subject to selective hydrodesulfurization to obtain a desulfurized heavy gasoline fraction, wherein, a cutting temperature of the light gasoline fraction and the heavy gasoline fraction is 70-110° C., for instance, 80-100° C.

In the present invention, the gasoline may be fluid catalytic cracking gasoline, coking gasoline, etc.; the cutting refers to cutting of the gasoline into a light gasoline fraction and a heavy gasoline fraction according to a distillation range from low to high. Moreover, a desulfurized gasoline may be prepared by mixing the desulfurized light gasoline fraction with the desulfurized heavy gasoline fraction.

Furthermore, the adsorption desulfurization is conducted using a fixed-bed at atmospheric pressure, a temperature of the adsorption desulfurization is controlled between 20-100° C., for instance, 30-80° C., and a flow rate of the gasoline is 0.3-1 mL/min, for instance, 0.5 mL/min.

The method for desulfurization of gasoline of the present invention may further include:

washing the desulfurization adsorbent which is subjected to the adsorption desulfurization with steam to collect a sulfur-rich component;

mixing the sulfur-rich component with the heavy gasoline fraction to conduct the selective hydrodesulfurization.

Furthermore, the method for desulfurization of gasoline also includes:

after washing the desulfurization adsorbent which is subjected to the adsorption desulfurization with the steam, drying the washed desulfurization absorbent with nitrogen at a temperature of 200-400° C., and cooling the dried desulfurization adsorbent with nitrogen to realize regeneration of the desulfurization adsorbent.

Specifically, steam at a temperature of 130-180° C. may be used to sweep the desulfurization adsorbent which is subjected to the adsorption desulfurization for 1-3 h for washing, then nitrogen at a temperature of 200-400° C. is used to sweep a same for 10-60 min for drying, and finally nitrogen at a room temperature is used to sweep the same for 10-60 min for cooling.

In the method for desulfurization of gasoline according to the present invention, the heavy gasoline fraction and hydrogen are subjected to the selective hydrodesulfurization in the presence of a selective hydrodesulfurization catalyst to obtain the desulfurized heavy gasoline fraction, wherein, a temperature of the selective hydrodesulfurization is 200-300° C., a pressure thereof is 1.5-2.5 MPa, a liquid hourly space velocity (the heavy gasoline fraction) is 1-5 $h^{-1}$, a volume ratio of hydrogen to oil is 400-600.

The selective hydrodesulfurization catalyst described in the present invention may be a conventional catalyst subjecting gasoline to selective hydrodesulfurization in the prior art, such as a catalyst of RSDS-I, RSDS-21, RSDS-22 in the RSDS process, a catalyst of HR806 and HR841 in the Prime-G+ process, a combined catalyst of FGH-20/FGH-11 in the OCT-M process, an HDOS series deep hydrodesulfurization catalyst in the CDOS process, etc.

In an embodiment, the hydrodesulfurization catalyst is obtained by loading a carrier with an active metal component, wherein, the carrier is a zeolite (such as the X type, the Y type or the ZSM-5 type zeolite) or a metal oxide (such as aluminium oxide), and the active metal includes Co and Mo. Furthermore, Co and Mo have an overall loading of 5-20% on the carrier. Furthermore, Co and Mo which are loaded on the carrier have a mass ratio of (0.2-0.6):1.

In an embodiment, the light gasoline fraction may be subjected to the adsorption desulfurization after being subjected to demercaptan treatment.

In another embodiment, the gasoline may also be cut into the light gasoline fraction and the heavy gasoline fraction after being subjected to demercaptan treatment.

Furthermore, a conventional method may be used for the demercaptan treatment, such as an alkali extraction method or a mercaptan conversion method. The alkali extraction method uses an alkali solution to extract mercaptan therein for its removal, the amount of alkali contained in the alkali solution may be 5-50%, a volume ratio of oil to alkali may be (1-15):1, an operating temperature may be 10-60° C.; the mercaptan conversion method is to convert a small molecule of mercaptan into other sulfides for its removal, which may be conducted by means of prehydrogenation in a conventional alkali-free deodorization process and Prime-G+ process, where a condition for the alkali-free deodorization process may be: an operating pressure of a reactor is 0.2-1.0 MPa, a reaction temperature is 20-60° C., a feeding space velocity is 0.5-2.0 $h^{-1}$, a volume ratio of an air flow to a feeding flow is 0.2-1.0, the catalyst and the cocatalyst used may be a common catalyst in the art.

Implementations of the present invention have at least the following advantages:

1. The desulfurization adsorbent in the present invention uses a composite carrier comprising a zeolite and an active carbon which are subjected to alkali treatment respectively, and a specific active metal component is loaded on the composite carrier, the adsorbent not only has a large sulfur capacity and a good selectivity for sulfur, but also has highly deep desulfurization, and sulfur may be desulfurized to 1 ppmw (part per million by weight); in addition, the adsorbent has a long service life and relatively environment-friendly.

2. When using the desulfurization adsorbent of the present invention to conduct gasoline desulfurization, the operational condition of the process is mild, which can be conducted at an atmospheric pressure and a relatively low temperature, thus energy consumption is saved and operational costs are reduced.

3. The method for regenerating the desulfurization adsorbent of the present invention is simple and easy to operate, the regenerated desulfurization adsorbent does not need to be reduced with hydrogen prior to use, which is environment-friendly and economical; moreover, the desulfurization adsorbent can be regenerated many times, and still maintain a good desulfurization effect after being regenerated.

4. The desulfurization method in the present invention, after gasoline is cut into a light gasoline fraction and a heavy gasoline fraction, the light gasoline fraction is subjected to adsorption desulfurization, and the heavy gasoline fraction is subjected to selective hydrodesulfurization, this method not only can reduce the content of the hydrodesulfurized components, but also can realize deep desulfurization of gasoline feedstock, and there is almost no loss of octane number

DETAILED DESCRIPTION

In order to make objectives, technical solutions, and advantages of the present invention clearer, the technical solutions in embodiments of the present invention are hereinafter described clearly and completely with reference to the embodiments of the present invention. Obviously, the described embodiments are only a part of embodiments of the present invention, rather than all embodiments of the present invention. All other embodiments obtained by those skilled in the art based on embodiments of the present invention without any creative efforts shall fall within the protection scope of the present invention.

Embodiment 1

1. Prepare a Zeolite and Active Carbon Subjected to Alkali Treatment

Figure 1:
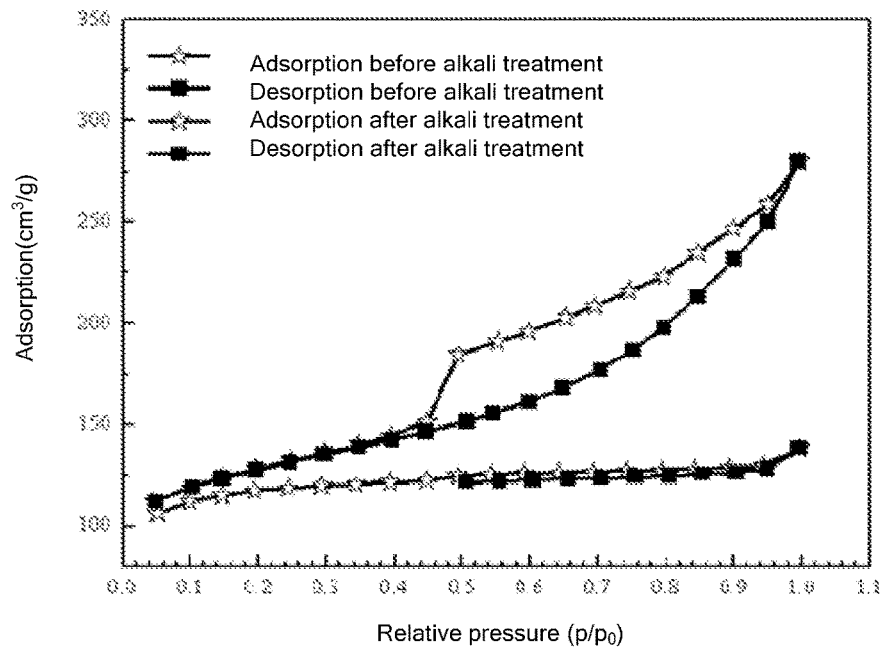
FIG. 1 is a curve of adsorption and desorption isotherms of a ZSM-5 type zeolite before and after alkali treatment according to Embodiment 1.
Figure 2:
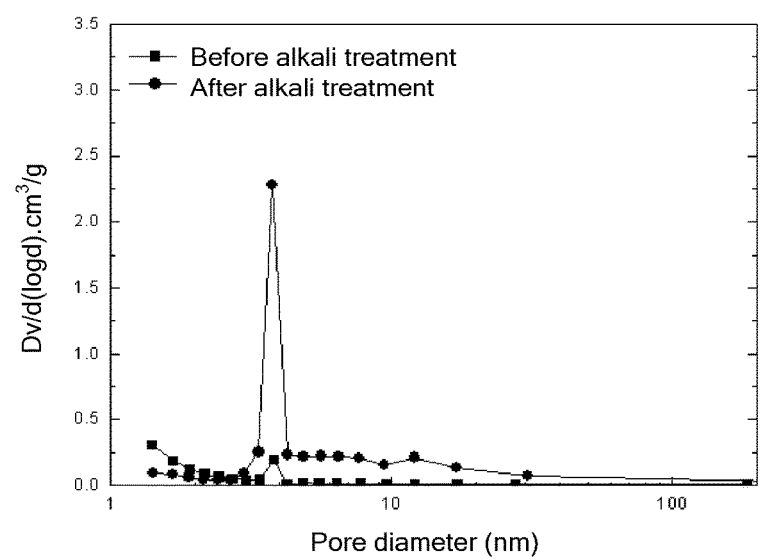
FIG. 2 is a curve of pore diameter distribution of a ZSM-5 type zeolite before and after alkali treatment according to Embodiment 1.

After elevating temperatures of two 500 mL of NaOH solutions at a concentration of 0.3 mol/L to about 70° C. by a water bath, adding 25 g of ZSM-5 type zeolite and 25 g of active carbon therein respectively, immediately lowering the temperature of the mixture to room temperature by an ice bath after stirring for about 200 minutes, filtering the mixture, and washing the filter cake with deionized water several times till a pH value of the filtrate is about 7, placing the filter cake obtained into an oven at a temperature of 110° C. to be dried for 4 h, and thus preparing a ZSM-5 type zeolite subjected to alkali treatment and active carbon subjected to alkali treatment respectively, where, curves of adsorption and desorption isotherms and pore diameter distribution of the ZSM-5 type zeolite before and after alkali treatment can be seen from FIG. 1 and FIG. 2 respectively.

In addition, an ASAP2000 type automatically physical adsorption instrument is used to measure specific surface areas and pore diameter distributions of the ZSM-5 type zeolite and the active carbon, and results are as shown in Table 1.

TABLE 1

| Carrier | Total specific surface area $S_{BET}$/ $(m^2 \cdot g^{-1})$ | Total pore volume V/ $(cm^3 \cdot g^{-1})$ | Medium pore volume $V_{meso}$/ $(cm^3 \cdot g^{-1})$ | Average pore diameter d/(nm) |
|---|---|---|---|---|
| ZSM-5 zeolite before alkali treatment | 380 | 0.212 | 0.041 | 2.241 |
| ZSM-5 zeolite after alkali treatment | 427 | 0.430 | 0.300 | 4.031 |
| Active carbon before alkali treatment | 1190 | 0.701 | 0.326 | 2.321 |
| Active carbon after alkali treatment | 1254 | 0.742 | 0.358 | 2.427 |

It can be seen from FIG. 1 that: the ZSM-5 zeolite before alkali treatment exhibits an I-type isotherm which is characterized by micropore properties, the desorption isotherm thereof is almost overlapped with the adsorption isotherm; whereas the ZSM-5 zeolite after alkali treatment exhibits an IV-type isotherm with obvious characteristics, which presents a continuous adsorption state till a saturation pressure within the entire measured pressure range, and which conducts desorption slowly with decrease in the pressure during the desorption firstly, when the pressure reaches a certain value, the desorption amount surges suddenly to form a relatively steep curve, and then it overlapped with the adsorption isotherm as pressure further decreases, thus it indicates that a great number of mesopores (medium pores) are generated in the ZSM-5 zeolite after alkali treatment.

It can be seen from FIG. 2 that, the ZSM-5 zeolite before alkali treatment is mainly micropores, there is a wide distribution before 2 nm and a small peak at a position of 3.5 nm, and substantially no pores after 4 nm, an obtained average pore diameter calculated using a t-plot method is about 2.3 nm; there is still a distribution of a part of micropores before 2 nm for the ZSM-5 zeolite after alkali treatment, and a strong peak at a position of about 3.8 nm, the peak height is almost about 11 times the height of the ZSM-5 zeolite before alkali treatment, and there is also a relative wide distribution of pores after 4 nm.

Meanwhile, results of Table 1 shows that: a medium pore volume and an average pore diameter of the ZSM-5 type zeolite subjected to alkali treatment are increased significantly, which indicates that a large number of micropores are converted into medium pores, thereby forming a composite pore structure of a mesopore and a micropore; the total specific surface area, the total pore volume, the medium pore volume and the average pore diameter of the active carbon subjected to alkali treatment are all increased.

2. Prepare a Composite Carrier

Placing the ZSM-5 type zeolite subjected to alkali treatment and the active carbon subjected to alkali treatment in a mortar to be ground into powders after mixing them at a mass ratio of 40:60, then placing the mixture in an oven at a temperature of 120° C. to be dried for 6 h, thereby preparing a composite carrier.

3. Prepare a Desulfurization Adsorbent

The composite carrier obtained above is firstly subjected to incipient wetness impregnation with a $K_2SO_4$ solution, after washing, drying and calcinating, then the composite carrier impregnated with $K_2SO_4$ solution is subjected to incipient wetness impregnation with $NiSO_4$, and after washing, drying and calcinating, a desulfurization adsorbent is prepared;

The washing, the drying and the calcinating described above are specifically: after washing the impregnated material with deionized water, drying it for 20 hours at a temperature of 120° C., after cooling the dried material down to room temperature, elevating the temperature to 400° C. at a speed of 6° C./min firstly, and then elevating the temperature to 550° C. at a speed of 3° C./min, conducting calcinations for 4 hours at the temperature of 550° C.

In the desulfurization adsorbent prepared above, K has a loading of about 5% on the composite carrier, Ni has a loading of about 10% on the composite carrier; moreover, K and Ni which are loaded on the composite carrier have a mass ratio of 0.5:1.

Embodiment 2

1. Prepare a Zeolite and an Active Carbon Subjected to Alkali Treatment

After elevating temperatures of two 500 mL of NaOH solutions at a concentration of 0.2 mol/L to about 80° C. by a water bath, adding 25 g of Y type zeolite and 25 g of active carbon therein respectively, immediately lowering a temperature of the mixture to room temperature by an ice bath after stirring for about 120 minutes, filtering the mixture, and washing the filter cake with deionized water several times till pH value of the filtrate is about 7, placing the filter cake obtained into an oven at a temperature of 120° C. to be dried for 3 h, and thus preparing a Y type zeolite subjected to alkali treatment and active carbon subjected to alkali treatment respectively; specific surface areas and pore diameter distributions of the Y type zeolite and the active carbon as shown in Table 2.

TABLE 2

Specific Surface Areas and Pore Diameters of Y Type Zeolite and Active Carbon

| Carrier | Total specific surface area $S_{BET}$/ $(m^2 \cdot g^{-1})$ | Total pore volume V/ $(cm^3 \cdot g^{-1})$ | Medium pore volume $V_{meso}$/ $(cm^3 \cdot g^{-1})$ | Average pore diameter d/(nm) |
|---|---|---|---|---|
| Y type zeolite before alkali treatment | 706 | 0.390 | 0.053 | 2.001 |
| Y type zeolite after alkali treatment | 713 | 0.462 | 0.118 | 2.139 |
| Active carbon before alkali treatment | 1190 | 0.701 | 0.326 | 2.321 |
| Active carbon after alkali treatment | 1233 | 0.729 | 0.355 | 2.346 |

2. Prepare a Composite Carrier

Placing the Y type zeolite subjected to alkali treatment and the active carbon subjected to alkali treatment in a mortar to be ground into powders after mixing them at a mass ratio of 20:80, then placing the mixture in an oven at a temperature of 110° C. to be dried for 6 h, thereby preparing a composite carrier.

3. Prepare a Desulfurization Adsorbent

The composite carrier obtained above is firstly subjected to incipient wetness impregnation with a $ZnSO_4$ solution, after washing, drying and calcinating, then the composite carrier impregnated with the $ZnSO_4$ solution is subjected to incipient wetness impregnation with $Fe_2(SO_4)_3$, thereby preparing a desulfurization adsorbent after washing, drying and calcinating;

The washing, the drying and the calcinating described above are specifically: after washing the impregnated material with deionized water, drying it for 24 hours at a temperature of 110° C., after cooling the dried material down to a room temperature, elevating the temperature to 400° C. at a speed of 6° C./min firstly, and then elevating the temperature to 450° C. at a speed of 3° C./min, conducting calcinations for 6 hours at the temperature of 450° C.

In the desulfurization adsorbent prepared above, Zn has a loading of about 10% on the composite carrier, Fe has a loading of about 10% on the composite carrier; moreover, Zn and Fe which are loaded on the composite carrier have a mass ratio of 1:1.

Embodiment 3

1. Prepare a Zeolite and an Active Carbon Subjected to Alkali Treatment

After elevating temperatures of two 500 mL of NaOH solutions at a concentration of 0.3 mol/L to about 80° C. by a water bath, adding 25 g of X type zeolite and 25 g of active carbon therein respectively, immediately lowering a temperature of the mixture to room temperature by an ice bath after stirring for about 180 minutes, filtering the mixture, and washing the filter cake with deionized water several times till a pH value of the filtrate is about 7, placing the filter cake obtained into an oven at a temperature of 100° C. to be dried for 6 h, and thus preparing an X type zeolite subjected to alkali treatment and active carbon subjected to alkali treatment respectively.

2. Prepare a Composite Carrier

Placing the X type zeolite subjected to alkali treatment and the active carbon subjected to alkali treatment in a mortar to be ground into powders after mixing them at a mass ratio of 30:70, then placing the mixture in an oven at a temperature of 120° C. to be dried for 6 h, thereby preparing a composite carrier.

3. Prepare a Desulfurization Adsorbent

The composite carrier prepared above is firstly subjected to incipient wetness impregnation with a $K_2SO_4$ solution, and after washing, drying and calcinating, then the composite carrier impregnated with the $K_2SO_4$ solution is subjected to incipient wetness impregnation with $NiSO_4$, thereby preparing a desulfurization adsorbent after washing, drying and calcinating;

The washing, the drying and the calcinating described above are specifically: after washing the impregnated material with deionized water, drying it for 18 hours at a temperature of 120° C., after cooling the dried material down to a room temperature, elevating the temperature to 400° C. at a speed of 6° C./min firstly, and then elevating the temperature to 640° C. at a speed of 3° C./min, conducting calcinations for 5 hours at the temperature of 640° C.

In the desulfurization adsorbent prepared above, K has a loading of about 5% on the composite carrier, Ni has a loading of about 15% on the composite carrier; moreover, K and Ni which are loaded on the composite carrier have a mass ratio of 0.3:1.

Embodiment 4

1. Prepare a Zeolite and an Active Carbon Subjected to Alkali Treatment

After elevating temperatures of two 500 mL of NaOH solutions at a concentration of 0.2 mol/L to about 70° C. by a water bath, adding 25 g of ZSM-5 type zeolite and 25 g of active carbon therein respectively, immediately lowering a temperature of the mixture to room temperature by an ice bath after stirring for about 90 minutes, filtering the mixture, and washing the filter cake with deionized water several times till a pH value of the filtrate is about 7, placing the filter cake obtained into an oven at a temperature of 120° C. to be dried for 3 h;

Repeating the above steps one time respectively for the ZSM-5 type zeolite and the active carbon obtained (that is, conducting alkali treatment twice), and thus preparing a ZSM-5 type zeolite subjected to alkali treatment and an active carbon subjected to alkali treatment; specific surface areas and pore diameter distributions of the ZSM-5 type zeolite and the active carbon as shown in Table 3.

TABLE 3

Specific Surface Areas and Pore Diameters of ZSM-5 Type Zeolite and Active Carbon

| Carrier | Total specific surface area $S_{BET}$/ ($m^2 \cdot g^{-1}$) | Total pore volume V/ ($cm^3 \cdot g^{-1}$) | Medium pore volume $V_{meso}$/ ($cm^3 \cdot g^{-1}$) | Average pore diameter d/(nm) |
|---|---|---|---|---|
| ZSM-5 type zeolite before alkali treatment | 380 | 0.212 | 0.041 | 2.241 |
| ZSM-5 type zeolite after alkali treatment | 432 | 0.433 | 0.302 | 4.030 |
| Active carbon before alkali treatment | 1190 | 0.701 | 0.326 | 2.321 |
| Active carbon after alkali treatment | 1259 | 0.749 | 0.363 | 2.430 |

2. Prepare a Composite Carrier

Placing the ZSM-5 type zeolite subjected to alkali treatment and the active carbon subjected to alkali treatment in a mortar to be ground into powders after mixing them at a mass ratio of 20:80, then placing the mixture in an oven at a temperature of 100° C. to be dried for 8 h, thereby preparing a composite carrier.

3. Prepare a Desulfurization Adsorbent

The composite carrier obtained above is subjected to incipient wetness impregnation with a $ZnSO_4$ solution, after washing, drying and calcinating, then the composite carrier impregnated with the $ZnSO_4$ solution is subjected to incipient wetness impregnation with $Fe_2(SO_4)_3$, and after washing, drying and calcinating, desulfurization absorbent is prepared;

The washing, drying and calcinating described above are specifically: after washing the impregnated material with deionized water, drying it for 20 hours at a temperature of 120° C., after cooling the dried material down to a room temperature, elevating the temperature to 400° C. at a speed of 6° C./min firstly, and then elevating the temperature to 600° C. at a speed of 3° C./min, conducting calcinations for 6 hours at the temperature of 600° C.

In the desulfurization adsorbent prepared above, Zn has a loading of about 5% on the composite carrier, Fe has a loading of about 10% on the composite carrier; moreover, Zn and Fe which are loaded on the composite carrier have a mass ratio of 0.5:1.

Comparative Embodiment 1

After preparing a ZSM-5 type zeolite subjected to alkali treatment according to the method described in Embodiment 1, the ZSM-5 type zeolite subjected to alkali treatment is subjected to incipient wetness impregnation with a $K_2SO_4$ solution and a $NiSO_4$ solution according to the method described in Embodiment 1 sequentially, and washing, drying and calcinating, thereby preparing a desulfurization adsorbent.

Comparative Embodiment 2

After preparing an active carbon subjected to alkali treatment according to the method described in Embodiment 1, the active carbon subjected to alkali treatment is subjected to incipient wetness impregnation with a $K_2SO_4$ solution and a $NiSO_4$ solution according to the method described in Embodiment 1 sequentially, and washing, drying and calcinating, thereby preparing a desulfurization adsorbent.

Comparative Embodiment 3

Placing a ZSM-5 type zeolite (without alkali treatment) and an active carbon (without alkali treatment) in Embodiment 1 into a mortar to ground after directly mixing them at a mass ratio of 40:60, then placing it in an oven at a temperature of 120° C. to be dried for 6 h, thereby preparing a composite carrier.

The composite carrier is subjected to incipient wetness impregnation with a $K_2SO_4$ solution and a $NiSO_4$ solution according to the method described in Embodiment 1 sequentially, and washing, drying and calcinating, thereby preparing a desulfurization adsorbent.

Embodiment 5

Filling the desulfurization adsorbent prepared in Embodiments 1-4 and Comparative Embodiments 1-3 into a fixed-bed reactor respectively, using a fluid catalytic cracking gasoline as a feedstock (see Table 4 for its composition), carrying out an adsorption desulfurization experiment for consecutive 10 hours at a flow rate of 0.5 mL/min at a temperature of 30° C. and atmospheric pressure, see Table 5 for a result of the adsorption desulfurization experiment, where a sulfur capacity is a total desulfurized sulfur content (by gram) when 1 g of desulfurization adsorbent reduces the total sulfur content in the gasoline below 10 ppmw, for instance, when the sulfur capacity is 0.514, it indicates that the total desulfurized sulfur content desulfurized is 0.514 g on 1 g of desulfurization adsorbent to reduce the total sulfur content in the gasoline feedstock below 10 ppmw.

TABLE 4

Composition of Gasoline Feedstock

| Items | | Value |
|---|---|---|
| Density (20° C.), g/cm$^3$ | | 0.7012 |
| Total sulfur content, ppmw | | 282 |
| Thiophene and derivatives thereof, ppmw | | 260 |
| Composition, m % | Paraffin | 35.0 |
| | Olefin | 48.2 |
| | Naphthene | 6.3 |
| | Aromatics | 10.5 |
| Octane number | RON | 90.2 |
| | MON | 80.9 |

TABLE 5

Result of Adsorption Desulfurization Experiment of Desulfurization Adsorbent

| Desulfurization adsorbent | Sulfur capacity | Total sulfur content of gasoline after adsorption desulfurization (ppmw) | Time of duration (hour) |
|---|---|---|---|
| Desulfurization adsorbent in Embodiment 1 | 0.514 | <1 | 0-4.5 |
| | | <10 | 4.5-6.3 |
| | | <50 | 6.3-8.3 |
| Desulfurization adsorbent in Embodiment 2 | 0.547 | <1 | 0-4.8 |
| | | <10 | 4.8-6.7 |
| | | <50 | 6.7-8.6 |
| Desulfurization adsorbent in Embodiment3 | 0.563 | <1 | 0-5.0 |
| | | <10 | 5.0-6.9 |
| | | <50 | 6.9-8.8 |
| Desulfurization adsorbent in Embodiment 4 | 0.490 | <1 | 0-4.3 |
| | | <10 | 4.3-6.0 |
| | | <50 | 6.0-8.0 |
| Desulfurization adsorbent in Comparative Embodiment1 | 0.286 | <1 | 0-2.1 |
| | | <10 | 2.1-3.5 |
| | | <50 | 3.5-4.2 |
| Desulfurization adsorbent in Comparative Embodiment 2 | 0.236 | <1 | 0-1.5 |
| | | <10 | 1.5-2.9 |
| | | <50 | 2.9-3.9 |
| Desulfurization adsorbent in Comparative Embodiment 3 | 0.155 | <1 | 0-0.8 |
| | | <10 | 0.8-1.9 |
| | | <50 | 1.9-2.7 |

It can be seen from a result as shown in Table 5 that:

1. The adsorbent for desulfurization prepared in the present invention has highly deep desulfurization, sulfur in a gasoline feedstock may be reduced to below 1 ppmw after conducting adsorption desulfurization for 4-5 hours, and its service life lasts for about 8 h; moreover, the adsorbent for desulfurization has a large sulfur capacity and a good selectivity especially for thiophene and derivatives thereof.

2. When a zeolite subjected to alkali treatment is used as a carrier alone, service life of the adsorbent for desulfurization is shortened significantly; and when active carbon subjected to alkali treatment is used as a carrier alone, desulfurization adsorbent has a low selectivity for sulfur; when a zeolite and active carbon without alkali treatment are used as a composite carrier, sulfur capacity is relatively small and service life is short.

Embodiment 6

Taking the desulfurization adsorbent in Embodiments 1-4 for desulfurization to breakthrough sulfur capacity (that is, the adsorbent loses efficacy) according to the method described in Embodiment 5 as a to-be-regenerated desulfurization adsorbent, firstly sweeping the to-be-regenerated desulfurization adsorbent with steam for washing, then sweeping the same with nitrogen for drying, and finally sweeping the same with nitrogen at a room temperature for cooling, see Table 6 for parameters of the regenerating process.

The regenerated desulfurization adsorbent is repeatedly subjected to adsorption desulfurization and regeneration according to the method described in Embodiment 5, a desulfurization adsorbent subjected to adsorption desulfurization for three times and regeneration for three times is used to conduct adsorption desulfurization according the method described in Embodiment 5, and see Table 7 for a result of the adsorption desulfurization experiment.

TABLE 6

Parameters of Regenerating Process of Desulfurization Adsorbent

| | Steam-sweeping for washing | | Nitrogen-sweeping for drying | | Nitrogen-sweeping for cooling | |
|---|---|---|---|---|---|---|
| Adsorbents | Steam temperature (° C.) | Sweeping time (h) | Nitrogen temperature (° C.) | Sweeping time (min) | Nitrogen temperature (° C.) | Sweeping time (min) |
| Desulfurization adsorbent in Embodiment 1 | 150 | 3 | 300 | 30 | 30 | 30 |
| Desulfurization adsorbent in Embodiment 2 | 180 | 1 | 400 | 10 | 35 | 10 |
| Desulfurization adsorbent in | 130 | 3 | 200 | 60 | 20 | 60 |

TABLE 6-continued

Parameters of Regenerating Process of Desulfurization Adsorbent

| Adsorbents | Steam-sweeping for washing | | Nitrogen-sweeping for drying | | Nitrogen-sweeping for cooling | |
|---|---|---|---|---|---|---|
| | Steam temperature (° C.) | Sweeping time (h) | Nitrogen temperature (° C.) | Sweeping time (min) | Nitrogen temperature (° C.) | Sweeping time (min) |
| Desulfurization adsorbent in Embodiment 4 | 160 | 2 | 300 | 45 | 25 | 45 |

TABLE 7

Result of Adsorption Desulfurization Experiment of Desulfurization Adsorbent Regenerated for Three Times

| Adsorbents | Sulfur capacity | Total sulfur content of gasoline after adsorption desulfurization (ppmw) | Time of duration (hour) |
|---|---|---|---|
| Desulfurization adsorbent in Embodiment 1 | 0.473 | <1 | 0-4.2 |
| | | <10 | 4.2-5.8 |
| | | <50 | 5.8-7.0 |
| Desulfurization adsorbent in Embodiment 2 | 0.481 | <1 | 0-4.4 |
| | | <10 | 4.4-5.8 |
| | | <50 | 5.8-7.2 |
| Desulfurization adsorbent in Embodiment 3 | 0.514 | <1 | 0-4.5 |
| | | <10 | 4.5-6.3 |
| | | <50 | 6.3-8.3 |
| Desulfurization adsorbent in Embodiment 4 | 0.457 | <1 | 0-4.0 |
| | | <10 | 4.0-5.6 |
| | | <50 | 5.6-6.8 |

It can be seen from a result of Table 7 that:

After the desulfurization adsorbent according to the present invention is subjected to regeneration several times by using the regenerating method described above, the desulfurization adsorbent still can maintain a high sulfur capacity and a good desulfurization effect.

Embodiment 7

1. Prepare a Selective Hydrodesulfurization Catalyst

A ZSM-5 type zeolite (carrier) is firstly subjected to incipient wetness impregnation with a $CoSO_4$ solution, after washing, drying and calcinating, then the ZSM-5 type zeolite impregnated with the $CoSO_4$ solution is subjected to incipient wetness impregnation with an aqueous solution of $(NH_4)_6Mo_7O_{24}\cdot 4H_2O$, and after washing, drying and calcinating, a selective hydrodesulfurization catalyst is prepared, wherein, reference may be made to Embodiment 1 for a specific operation of the washing, the drying and the calcinating.

A total specific surface area of the selective hydrodesulfurization catalyst prepared above is about 356 m²/g, a total pore volume is about 0.315 cm³·g⁻¹, Co has a loading of about 5% on the carrier, Mo has a loading of about 10% on the carrier, and Co and Mo which are loaded on the carrier have a mass ratio of 0.5:1.

2. Gasoline Desulfurization

Figure 3:
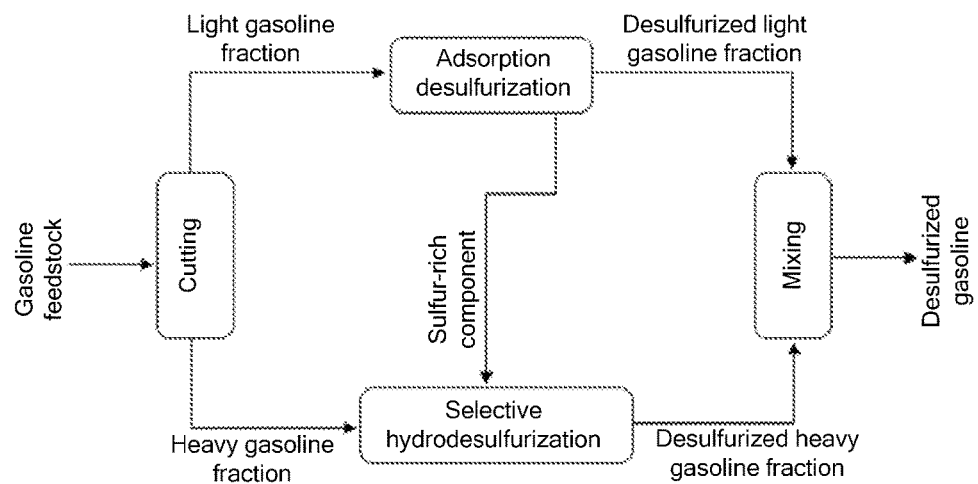
FIG. 3 is a process flow chart of a method for desulfurization of gasoline according to Embodiment 7.

Fluid catalytic cracking gasoline which is produced from Daqing atmospheric pressure heavy oil subjected to catalytic cracking is taken as a feedstock (see Table 8 for its composition), and a process flow of desulfurization of the gasoline feedstock as shown in FIG. 3.

Firstly, cutting the gasoline feedstock into a light gasoline fraction and a heavy gasoline fraction, where a cutting temperature of the light and heavy gasoline fraction is 100° C.

Filling the desulfurization adsorbent prepared in Embodiment 1 into a fixed-bed reactor, and at a temperature of 30° C. and atmospheric pressure, the light gasoline fraction being subjected to adsorption desulfurization at a flow rate of 0.5 mL/min to obtain a desulfurized light gasoline fraction; in addition, after the adsorption desulfurization, sweeping the desulfurization adsorbent which has been subject to the adsorption desulfurization with steam at a temperature of 150° C. for 3 h for washing, collecting a sulfur-rich component, and incorporating the sulfur-rich component into the heavy gasoline fraction to proceed with a next step.

Filling the selective hydrodesulfurization catalyst prepared above into the fixed-bed reactor, the heavy gasoline fraction incorporated with the sulfur-rich component is subjected to selective hydrodesulfurization in a condition where a reacting temperature is 260° C., a reacting pressure is 1.8 MPa, a liquid hourly space velocity is 3.0 h⁻¹, and a volume ratio of hydrogen to oil is 500, thereby obtaining a desulfurized heavy gasoline fraction. Mixing the desulfurized heavy gasoline fraction with the desulfurized light gasoline fraction to prepare a desulfurized gasoline, and see Table 8 for its composition.

TABLE 8

Composition of Gasoline before and after Desulfurization

| Items | | Gasoline feedstock | Desulfurized gasoline |
|---|---|---|---|
| Density (20° C.), g/cm³ | | 0.7012 | 0.7252 |
| Sulfur content, ppmw | | 282 | 10 |
| Group composition, m % | Paraffin | 35.0 | 47.2 |
| | Olefin | 48.2 | 24.0 |
| | Naphthene | 6.3 | 11.5 |
| | Aromatics | 10.5 | 17.3 |
| Octane number | RON | 90.2 | 89.7 |
| | MON | 80.9 | 80.6 |

It can be seen from Table 8 that:

The method for desulfurization of gasoline as described in this Embodiment not only can reduce sulfur content in the gasoline feedstock below 10 ppm, but also can control olefin content below 24%, and loss of octane number (RON) is only 0.5.

Embodiment 8

1. Prepare a Selective Hydrodesulfurization Catalyst

Preparing a selective hydrodesulfurization catalyst according to the method described in Embodiment 7, whereas the difference lies in that, controlling Co to have a loading of about 2% on the carrier, and controlling Mo to have a loading of about 8% on the carrier; moreover, Co and Mo which are loaded on the carrier have a mass ratio of 0.25:1.

2. Gasoline Desulfurization

Figure 4:
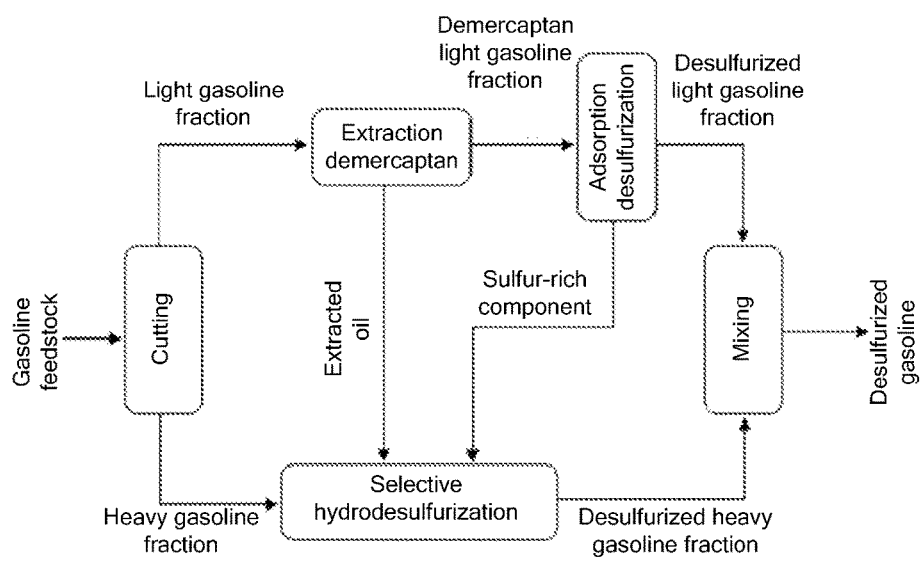
FIG. 4 is a process flow chart of a method for desulfurization of gasoline according to Embodiment 8.

Fluid catalytic cracking gasoline from Daqing is taken as a feedstock (see Table 9 for its composition), and a process flow of desulfurization of the gasoline feedstock as shown in FIG. 4.

Firstly, fractionating the gasoline feedstock into a light gasoline fraction and a heavy gasoline fraction, where a cutting temperature of the light and heavy gasoline fractions is 80° C.

The light gasoline fraction is enabled to be in contact with alkali solution for demercaptan treatment in an extraction system, where the alkali used is a NaOH solution in a mass content of 20%, a volume ratio of the light gasoline fraction to the NaOH solution is 5:1, an operating temperature is 30° C., a demercaptan light gasoline fraction and extracted oil are collected, and the extracted oil is incorporated into the heavy gasoline fraction to proceed with a next step.

Filling the desulfurization adsorbent prepared in Embodiment 2 into a fixed-bed reactor, at a temperature of 30° C. and atmospheric pressure, the demercaptan light gasoline fraction being subjected to adsorption desulfurization at a flow rate of 0.3 mL/min to obtain a desulfurized light gasoline fraction; after the adsorption desulfurization, sweeping the desulfurization adsorbent subjected to the adsorption desulfurization with steam at a temperature of 180° C. for 1 h for washing, collecting a sulfur-rich component, and incorporating the sulfur-rich component into the heavy gasoline fraction to proceed with a next step.

Filling the selective hydrodesulfurization catalyst prepared above into the fixed bed reactor, the heavy gasoline fraction incorporated with extracted oil and the sulfur-rich component is subjected to hydrodesulfurization in a condition where a reacting temperature is 300° C., a reacting pressure is 1.5 MPa, a liquid hourly space velocity is 4.0 h$^{-1}$, and a volume ratio of hydrogen to oil is 600, thereby obtaining a desulfurized heavy gasoline fraction. Mixing the desulfurized heavy gasoline fraction with the desulfurized light gasoline fraction to prepare a desulfurized gasoline, and see Table 9 for its composition.

TABLE 9

Composition of Gasoline before and after Desulfurization

| Items | | Gasoline feedstock | Desulfurized gasoline |
|---|---|---|---|
| Density (20° C.), g/cm$^3$ | | 0.7012 | 0.7208 |
| Sulfur content, ppmw | | 282 | 10 |
| Group composition, m % | Paraffin | 35.0 | 47.8 |
| | Olefin | 48.2 | 23.2 |
| | Naphthene | 6.3 | 11.4 |
| | Aromatics | 10.5 | 17.6 |
| Octane number | RON | 90.2 | 89.5 |
| | MON | 80.9 | 80.2 |

It can be seen from Table 9 that:

The method for desulfurization of gasoline as described in this Embodiment not only can reduce sulfur content in the gasoline feedstock below 10 ppm, but also can control olefin content below 24%, and loss of octane number is only 0.7.

Embodiment 9

Figure 5:
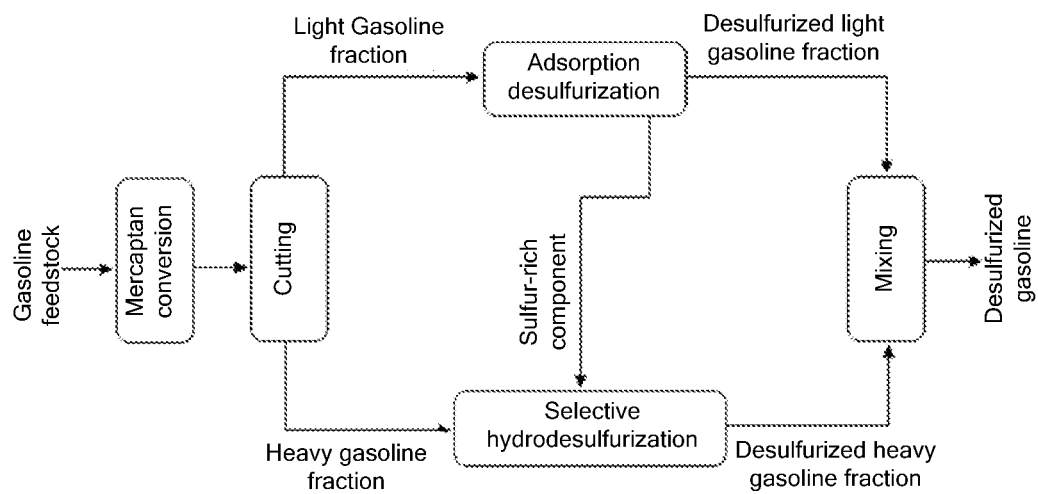
FIG. 5 is a process flow chart of a method for desulfurization of gasoline according to Embodiment 9.

Fluid catalytic cracking gasoline from Jinan is taken as a feedstock (see Table 10 for its composition), and a process flow of desulfurization of the gasoline feedstock as shown in FIG. 5.

Firstly, a mercaptan conversion method (an alkali-free deodorization process) is used to conduct demercaptan treatment for the gasoline feedstock, where an operating pressure of the reactor is controlled at about 0.5 MPa, a reacting temperature is about 40° C., a feeding space velocity is 1.0 h$^{-1}$ and a volume ratio of an air flow to a feeding flow is about 0.5 to collect a demercaptan gasoline.

The demercaptan gasoline feedstock is cut into a light gasoline fraction and a heavy gasoline fraction, and a cutting temperature of the light and the heavy gasoline fractions is 80° C.

Filling the desulfurization adsorbent prepared in Embodiment 4 into a fixed-bed reactor, and in a condition of temperature of 30° C. and atmospheric pressure, the light gasoline fraction is subjected to adsorption desulfurization at a flow rate of 0.8 mL/min to obtain a desulfurized light gasoline fraction; and after the adsorption desulfurization, sweeping the desulfurization adsorbent subjected to the adsorption desulfurization with steam at a temperature of 160° C. for 2 h for washing, collecting a sulfur-rich component, incorporating the sulfur-rich component into the heavy gasoline fraction to proceed with a next step.

Filling the selective hydrodesulfurization catalyst prepared in Embodiment 7 into the fixed-bed reactor, the heavy gasoline fraction incorporated with the sulfur-rich component is subjected to hydrodesulfurization in a condition where a reacting temperature is 300° C., a reacting pressure is 2.5 MPa, a liquid hourly space velocity is 2.0 h$^{-1}$, and a volume ratio of hydrogen to oil is 400, thereby obtaining a desulfurized heavy gasoline fraction. Mixing the desulfurized heavy gasoline fraction with the desulfurized light gasoline fraction to prepare a desulfurized gasoline, and see Table 10 for its composition.

TABLE 10

Composition of Gasoline before and after Desulfurization

| Items | | Gasoline feedstock | Desulfurized gasoline |
|---|---|---|---|
| Density (20° C.), g/cm$^3$ | | 0.7562 | 0.7748 |
| Surfur content, ppmw | | 421 | 10 |
| Group composition, m % | Paraffin | 25.6 | 35.0 |
| | Olefin | 30.9 | 12.6 |
| | Naphthene | 8.9 | 14.2 |
| | Aromatics | 34.6 | 38.2 |
| Octane number | RON | 89.2 | 88.6 |
| | MON | 80.1 | 79.8 |

It can be seen from Table 10 that:

The method for desulfurization of gasoline as described in this embodiment not only can reduce sulfur content in the gasoline feedstock below 10 ppm, but also can control olefin content below 24%, and loss of octane number is only 0.6.

Finally, it should be noted that the foregoing embodiment are merely intended for describing technical solutions of the present invention rather than limiting the present invention. Although the present invention is described in detail with reference to the foregoing embodiments, those skilled in the art should understand that they may still make modifications to the technical solutions described in the foregoing embodiments, or make equivalent replacements to some or all technical features thereof; however, these modifications or replacements do not make the essence of corresponding technical solutions depart from the scope of the technical solutions in the embodiments of the present invention.

What is claimed is:

1. An adsorbent for desulfurization of gasoline, wherein the absorbent is obtained by loading an active metal component on a composite carrier, the composite carrier comprises a zeolite and an active carbon, wherein the zeolite and the active carbon are treated with alkali respectively before they are mixed to prepare the composite carrier, wherein the zeolite and the active carbon being treated with alkali respectively comprises treating the zeolite and the active carbon, respectively, as follows: blending at a mass ratio of the zeolite or the active carbon to alkali to water: (0.1-2): (0.05-2):(4-15), and stirring the mixture for 0.1-24 h at a temperature of 0-120° C., and then drying, the active metal is selected from one or more of elements of IA, VIII, IB, IIB and VIB groups in the periodic table.

2. The adsorbent for desulfurization of gasoline according to claim 1, wherein a mass ratio of the zeolite to the active carbon in the composite carrier is (20-80): (80-20).

3. The adsorbent for desulfurization of gasoline according to claim 1, wherein the zeolite is an X type, a Y type or a ZSM-5 type zeolite.

4. The adsorbent for desulfurization of gasoline according to claim 1, wherein the active metal is selected from at least two of Ni, Fe, Ag, Co, Mo, Zn and K.

5. The adsorbent for desulfurization of gasoline according to claim 1, wherein the active metal has a loading of 2-30% on the composite carrier.

6. A method for preparing the adsorbent for desulfurization of gasoline according to claim 1, comprising steps of:
blending the zeolite and the active carbon subjected to alkali treatment, respectively, in proportion to prepare the composite carrier;
impregnating the composite carrier with a soluble salt solution of the active metal, drying the composite carrier impregnated with soluble salt solution and, then, calcinating to obtain the adsorbent for desulfurization of gasoline.

7. The method according to claim 6, wherein the alkali treatment comprises treating the zeolite and the active carbon, respectively, as follows: blending at a mass ratio of the zeolite or the active carbon to alkali to water: (0.1-2): (0.05-2):(4-15), and stirring the mixture for 0.1-24 h at a temperature of 0-120° C., and then drying, the above alkali treatment is conducted at least one time.

8. The method according to claim 6, wherein calcinating the composite carrier impregnated with the soluble salt solution after being dried is conducted for 4-6 h at a temperature of between 450-640° C.

9. The method according to claim 6, wherein calcinating the composite carrier comprises cooling the composite carrier impregnated with the soluble salt solution after being dried down to a room temperature, elevating the temperature to 400° C. at a speed of 6° C./min firstly, and then elevating the temperature to 450-640° C. at a speed of 3° C./min.

10. A method for desulfurization of gasoline, comprising: conducting adsorption desulfurization to gasoline using the adsorbent according to claim 1.

11. The method for desulfurization of gasoline according to claim 10, comprising firstly cutting the gasoline into a light gasoline fraction and a heavy gasoline fraction, and then conducting adsorption desulfurization to the light gasoline fraction using the adsorbent to obtain a desulfurized light gasoline fraction, and conducting selective hydrodesulfurization to the heavy gasoline fraction to obtain a desulfurized heavy gasoline fraction; wherein, a cutting temperature of the light gasoline fraction and the heavy gasoline fraction is 70-110° C.

12. The method for desulfurization of gasoline according to claim 10, wherein the adsorption desulfurization is conducted using a fixed-bed at atmospheric pressure, and a temperature of the adsorption desulfurization is controlled between 20-100° C., a flow rate of the gasoline is 0.3-1 mL/min.

13. The method for desulfurization of gasoline according to claim 11, further comprising:
washing the adsorbent which is subjected to the adsorption desulfurization with steam to collect a sulfur-rich component;
mixing the sulfur-rich component with the heavy gasoline fraction to conduct the selective hydrodesulfurization.

14. The method for desulfurization of gasoline according to claim 11, further comprising:
washing the desulfurization adsorbent which is subjected to the adsorption desulfurization with steam, drying the washed adsorbent with nitrogen at a temperature of 200-400° C., and cooling the dried adsorbent with nitrogen to realize regeneration of the adsorbent.

15. The method for desulfurization of gasoline according to claim 11, wherein the heavy gasoline fraction and hydrogen are subjected to the selective hydrodesulfurization in the presence of a selective hydrodesulfurization catalyst to obtain the desulfurized heavy gasoline fraction, wherein, a temperature of the selective hydrodesulfurization is 200-300° C., a pressure is 1.5-2.5 MPa, a liquid hourly space velocity is 1-5 h-1, a volume ratio of hydrogen to oil is 400-600.

16. The method for desulfurization of gasoline according to claim 15, wherein the hydrodesulfurization catalyst is obtained by loading a carrier with an active metal component, wherein the carrier is a zeolite or a metal oxide, and the active metal comprises Co and Mo.

17. The method for desulfurization of gasoline according to claim 16, wherein Co and Mo have an overall loading of 5-20% on the carrier.

18. The method for desulfurization of gasoline according to claim 11, wherein the light gasoline fraction is subjected to the adsorption desulfurization after being subjected to demercaptan treatment.

19. The method for desulfurization of gasoline according to claim 11, wherein the gasoline is cut into the light gasoline fraction and the heavy gasoline fraction after being subjected to demercaptan treatment.

* * * * *